3,401,310
Patented Sept. 10, 1968

3,401,310

METHOD AND CIRCUIT FOR RAPID EXCITATION OF A MAGNETIC-FIELD DEVICE

Heinz Schäffersmann, Brake, near Bielefeld, and Ernst Tuchen, Jerxen-Orbke, Germany, assignors to Binder Magnete KG, Villingen, Black Forest, Germany, a corporation of Germany Filed Dec. 21, 1965, Ser. No. 515,372
Claims priority, application Germany, Dec. 21, 1964, Sch 36,288; Apr. 5, 1965, Sch 36,835
10 Claims. (Cl. 317—123)

The invention relates to a method and circuits for the rapid excitation of the magnetic field of electrical apparatus, for example magnetic couplings, magnetic brakes, magnetic valves, lifting magnets, tensioning magnets and the like, such as are used for switching operations and for power transfer or shut-down in a wide variety of machine tools and other fabricating machines. If these electrical apparatus are to work with precision, very short switching times are necessary. Short switching times are, however, limited by the delays which occur in the build-up of the magnetic field.

For reducing the build-up time of the magnetic field, devices for rapid excitation are known in which an ohmic resistance is connected in series with the magnetic field coil. This has the disadvantage that the power converted to heat in the ohmic resistance greatly increases the power consumption and that it is troublesome in some cases to provide for sufficient dissipation of the heat. Another form of rapid excitation device operates with a second supplementary voltage which is substantially higher than the operating voltage and which, by operation of time delay means, is switched off upon attainment of full excitation. This requires adding a circuit breaker for disconnecting the high supplemental voltage and with it the higher current at its full value. Hence, there arise all the difficulties peculiar to the disconnection of high direct voltages across inductances. If mechanical switch contacts are used, a high degree of contact burning occurs, or additional extinguishing elements must be used. If contactless semiconductor components are used, the inductive voltages must be allowed for and the components must be dimensioned for the high direct currents. All this involves a fairly considerable outlay, and certain switch circuits also cause undesired delay on switching off.

It is an object of the invention, to provide a rapid excitation device free of the disadvantages of the known arrangements, and capable of controlling the make and break switching by means of electronic components, so as to provide a reliable automatic method of operation of the shortest possible operating times and with very small power losses.

To achieve these objects and in accordance with our invention, we connect the magnetic field winding to a multi-phase alternating-current supply line through a multi-phase rectifier network whose several rectified direct voltages have respectively different maximal values, and we impress these voltages upon the magnetic field winding to be rapidly excited and maintain them effective until the current in the magnetic field winding has reached a value above that of the rated steady-state excitation.

According to another feature of our invention, we perform the just-mentioned rapid excitation method by employing a multi-phase, preferably three-phase transformer having respective secondary voltages electrically displaced four times 90°; that is, each voltage being 90° displaced relative to voltage in an adjacent phase. Furthermore, the rectifying devices connected to the secondary windings of the three-phase transformer consist of controlled rectifiers, preferably semiconductor controlled rectifiers, such as thyristors, which are fired by a firing voltage of a frequency considerably higher than the line frequency. This firing voltage is supplied to the controlled rectifiers through transformers, and the firing control circuit, comprising the latter transformers, is equipped with an inductive blocking member which operates in dependence upon the field excitation current to separate the respectively different frequencies of the field excitation voltage and of the much higher firing voltage. Furthermore, in order to produce the increased frequency of the firing voltage, we provide an astable flip-flop, preferably a transistorized astable multivibrator, whose output is applied to the firing or gate electrodes of the controlled rectifiers preferably through an amplifier and through the above-mentioned firing-circuit transformers.

The above-mentioned inductive blocking member, operating in dependence upon the operating current of the device to be rapidly field excited, is preferably formed of an RC member connected parallel to an IR-drop resistor in the field excitation circuit, and a transformer, whose primary winding is connected through a diode in parallel relation to the capacitor of the RC member, has its secondary winding connected in the primary circuit of the above-mentioned firing-circuit transformers.

The invention will be further described with reference to an embodiment of a rapid excitation method and circuit system according to the invention illustrated by way of example on the accompanying drawings in which.

Figure 1:
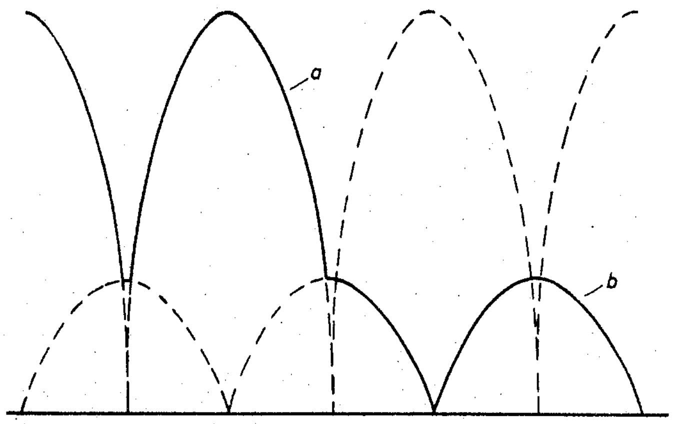
FIGS. 1 and 2 are explanatory graphs relating to the method of excitation.

Exemplified in FIG. 1 are time curves of excitation voltages typical of a system according to the invention, the abscissa denoting time and the ordinate values being indicative of voltage amplitudes. The increased voltage super-imposed upon the field coil of the device to be rapidly excited is represented by the curve *a*. The permanent or steady-state operating voltage of the device is shown at *b*. The particular conditions demonstrated by FIG. 1 involve the advantage that the maximum values of the rapid excitation voltage *a* cover the gaps in the steady-state field excitation voltage *b*. Consequently, when the field winding is being switched on at an unfavorable moment, such as at the moment $t_1$, the voltage impressed upon the winding has at least the maximum value of the normal operating voltage. The high auxiliary voltage *a* is shown discontinued at the moment $t_2$, assuming that up to this moment the magnetic field has become fully excited so that thereafter only the normal excitation voltage *b* is effective.

Figure 2:
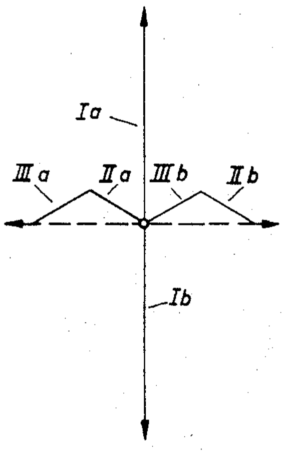

It should be understood that the voltage diagram of FIG. 1 relates to one phase of an excitation voltage derived from all of the secondary phases of a three-phase transformer. The vector diagram for all three phases of rectified voltage is shown in FIG. 2. *Ia*+*Ib* denote the respective vectors of the positive and negative voltages respectively in the first phase. The vectors II*a* and II*b* are the positive and negative voltages respectively of the second phase which is connected in series with the third phase whose positive and negative voltages are shown as vectors III*a* and III*b*. The resultant of these voltages is composed of four component vectors each being phase displaced 90° from the adjacent voltage, the two vectors resulting from II*a*, III*a* and II*b*, III*b* being represented by broken lines.

Figure 3:
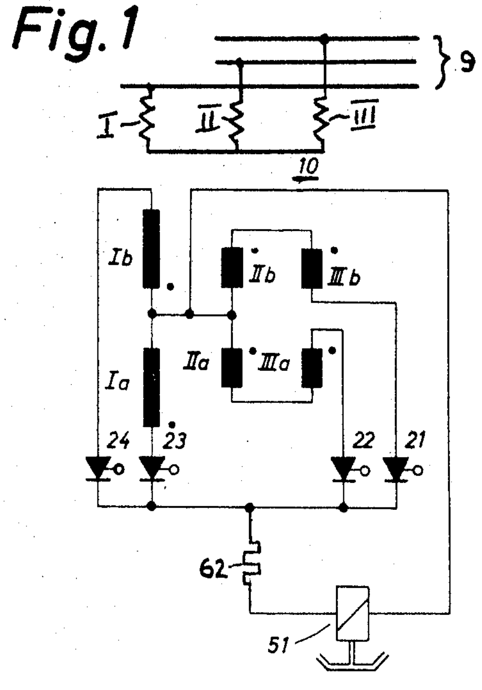
FIG. 3 shows schematically the main excitation circuit.
Figure 4:
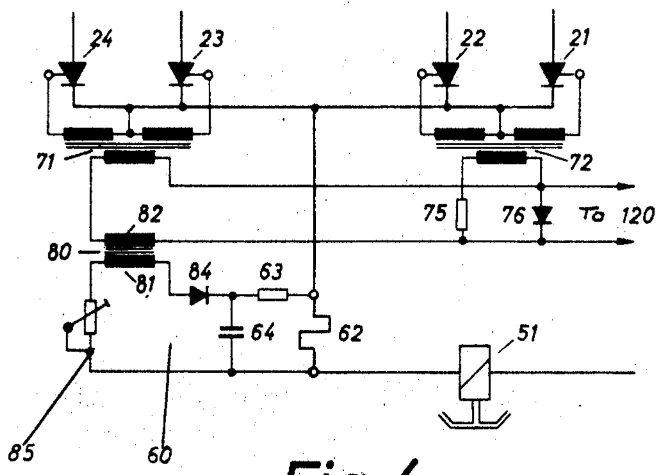
FIG. 4 is a circuit diagram of part of the same system showing details essential to the invention.
Figure 5:
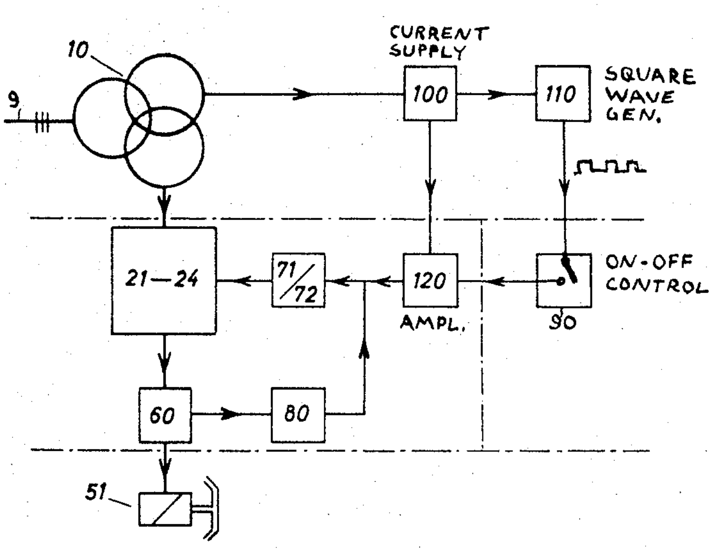
FIG. 5 is a block diagram of the entire system incorporating the features more fully shown in FIGS. 3 and 4.

Referring now to the system jointly represented by FIGS. 3, 4 and 5, in which an excitation performance according to FIGS. 1 and 2 is realized, the magnetic device whose field is to be rapidly excited is exemplified by the coil 51 of a contactor. This coil is connected to a three-phase power supply line 9 (FIG. 4) through a transformer 10 and a group of controlled rectifiers, preferably thyristors. As shown in FIG. 3, the transformer 10 has six secondary windings denoted by I*a*, I*b*, II*a*, II*b*, III*a*, III*b* in accordance with the respective voltage vectors of FIG. 2. The secondary windings I*a*, I*b*, II*a*, II*b* have a common mid-point connected to one end of the coil 51 to be rapidly excited. The other end of the coil 51 is connected to four parallel arranged thryistors 21, 22, 23 and 24. The respective other poles of thyristors 23 and 24 are connected to the free ends of windings I*a* and I*b* respectively. The corresponding poles of thyristors 21 and 22 are connected in series with the respective windings III*b* and III*a* to the free ends of respective windings II*b* and II*a*. The thyristors 21 and 22 serve to supply the contactor coil 51 with steady-state excitation in accordance with the voltage *b* in FIG. 1. The thyristors 23 and 24 conduct only during the building-up interval of the magnetic field of coil 51 and hence are connected in a circuit of increased voltage, this being indicated by greater length of transformer windings I*a*, I*b*. The thyristors 23, 24 are to be turned off upon completion of the rapid excitation stage, whereafter only the thyristors 21 and 22 are to remain in operation.

This particular control of the thyristors is effected by the circuit means separately illustrated in FIG. 4 and described presently. The excitation current I flowing through the magnet coil 51 causes a voltage drop in an IR-drop resistor 62 connected in series with the coil 51. This voltage is applied through a resistor 63 to a capacitor 64, both constituting an RC member. A transformer 80 has its primary winding 81 connected through a diode 84 across the same capacitor 64. The potentiometer 85 permits adjusting the current intensity for rapid excitation in the circuits 81–84–64–63–62. This current intensity is a measure of the counter voltage to be formed at the capacitor 64 and consequently also determines the moment when the rapid excitation is discontinued. In other words, by adjusting the potentiometer 85, the duration of the rapid excitation stage can be pre-adjusted or varied as may be desired.

The initially uncharged capacitor 64 represents a short circuit for the transformer primary winding 81 relative to the high frequency of the firing voltage supplied by the output circuit 120 (FIG. 4) of an amplifier 120 (FIG. 5) as more fully explained below. The secondary winding 82 of the auxiliary transformer 80 is series connected in the primary circuit of a transformer 71 which supplies firing pulses to the thyristors 23 and 24. The secondary winding 82, therefore, has the low inductive impedance required by the firing circuit in which the transformer 71 is connected. As soon as the capacitor 64 is fully charged, its voltage is higher than the voltage at the transformer primary winding 81. Now a current attempts to flow through the diode 84 in the opposite direction, thus blocking this diode. Since now the current can no longer flow in the primary winding 81, the inductive impedance of the secondary winding 82 increases considerably and thereby prevents a sufficient firing current from passing through the transformer 71. As a result, the firing of the thyristors 23 and 24 ceases. With the next zero passage, that is, when the cycle period of the voltage is terminated, the rapid excitation stage is concluded since the increased voltage is no longer present.

The circuit of the secondary winding 82 shown in FIG. 4 has a diode 76 connected across the series connection of winding 82 and the primary winding of the firing-circuit transformer 71. The diode 76 serves to always secure the same polarity of the voltage in the circuit 120 to make certain that the thyristors 21, 22, 23 and 24 can be fired.

The primary winding of another firing transformer 72 for the thyristors 21 and 22 is connected to the firing circuit 120 in series with a resistor 75 which compensates the ohmic share of the winding 82.

It will be recognized that the switching from rapid excitation to normal excitation is effected without mechanical contacts and in dependence upon the operating current of the magnetic field winding being excited. If voltage fluctuations occur in the alternating-current supply line, they automatically result in shortening or prolonging the rapid excitation stage. Analogously, an increased induction of the magnet coil is overcome by an automatic prolongation of the rapid excitation stage.

The over-all diagram of the system shown in FIG. 5 represents the control network of FIG. 4 by the block marked 60. The diagram of FIG. 5 analogously illustrates by blocks all of the above-described other components and also indicates further features relating to the production of the firing voltage.

The firing voltage is derived from the multi-phase power supply line 9 through the above-mentioned transformer 10. Produced from the output of transformer 10 is a direct voltage exhibiting only a slight ripple and hence having a low contents of harmonics. A conventional astable flip-flop, such as an astable multivibrator 110, is connected to the direct voltage and furnishes a square-wave output voltage at a frequency which is a multiple of the 50 or 60 c.p.s. line frequency. The square-wave frequency, for example about 2 c.p.s., is applied through an actuator or control unit 90 to the above-mentioned amplifier 120 and thence to the firing-circuit transformers 71 and 72 as described with reference to FIG. 4. The unit 90 contains any desired on-off control means for starting and stopping the current supply to the field winding 51.

Interposing an amplifier 120 between the frequency generator 110 and the transformers 71, 72 permits operating the control unit 90 at lower power so that it may be equipped with transistors or be controlled by light (photoelectric) barriers, punch tapes, sound tracks or the like information carriers. However, if the output of unit 90 is sufficient for directly energizing the transformers 71, 72, the amplifier 120 can be dispensed with. Since the greater part of the apparatus forms part of the network connected to the power supply line, this applying for example to the transformers, rectifiers and astable flip-flop, the major portion of the apparatus may be used for any desired number of magnetic devices simultaneously, the remaining portion required for any particular device 51 being very small so that the device affords a highly economical use.

The control system may also be modified in various respects, for example by providing a smaller or larger number of phases or providing a different number of controllable rectifiers or thyristors. The discontinuance of the increased voltage (rapid-excitation) may be readily effected in some other way, for example by providing a switch on the magnet being excited, in dependence upon a rotary movement of a magnetic coupling being excited by the control system, and in some analogous position-responsive or condition-responsive manner. While we prefer providing the system with semiconductor rectifiers, the system may instead be equipped with tubes or transductors (controlled saturable reactors or magnetic amplifiers).

Such and other modifications will be obvious, upon a study of this disclosure, to those skilled in the art and are indicative of the fact that the invention may be given embodiments other than particularly illustrated and described herein without departing from the essential features of the invention and within the scope of the claims annexed hereto.

As shown in FIG. 3, the primary side of the three-phase transformer 10 is star-connected and connected to the mains via lines R, S, T. The primary windings are coupled to the secondary windings illustrated underneath the primary windings, i.e. the primary winding R is coupled to the subjacent secondary winding I*a* and I*b*, the primary winding S to the subjacent secondary winding II*a* and II*b*, and the primary winding T to the subjacent secondary winding III*a* and III*b*.

The actuating member 90 shown in FIG. 5 is, in its simplest form, a switch, the opening and closing of which starts control. For example, this switch may be a light barrier or the contact of a regulator or another structural element. The actuating member 90 must only be capable of a switching operation and any known actuating member of this type is suitable.

The astable multivibrator for firing the controlled valves at high frequencies may be designed in the known manner; a great variety of examples of circuit arrangements for such a multivibrator are known in everyday practice. It may, for example, be a self-oscillating multivibrator comprising two transistors.

We claim:

1. The method of rapidly exciting the magnetic field of an electromagnetic device, which comprises deriving several mutually superimposed rectified single-phase voltages of respectively different maximal magnitudes from a multiphase alternating voltage supply, impressing said latter voltages upon the device when commencing the excitation, discontinuing said superimposed voltages when the current in the device has reached an intensity above the rated excitation value, and then continuing the excitation by applying normal excitation direct voltage to the device.

2. A circuit for rapidly exciting a magnetic field winding, comprising direct-voltage means connected to said winding for providing it with steady-state excitation voltage, multi-phase alternating-voltage supply means having a plurality of mutually phase-displaced output voltages of respectively different amplitudes, controllable rectifiers connecting said respective output voltages to said field winding for applying rectified auxiliary voltages to said winding when said rectifiers are conductive, and condition-responsive control means connected to said rectifiers for controlling them to conduct only during an excitation build-up interval, whereby said auxiliary voltages are effective until the current in said winding has reached an intensity above the rated excitation value.

3. In a rapid-excitation circuit according to claim 2, said alternating-voltage supply means comprising a multi-phase transformer having respective secondary windings furnishing said output voltages, said controllable rectifiers being connected between said respective secondary windings and said field winding.

4. In a rapid-excitation circuit according to claim 3, said direct-voltage means comprising further secondary windings on said transformer and further controllable rectifier means connecting said latter secondary windings with said field winding.

5. A rapid-excitation circuit according to claim 4, comprising an on-off control unit for switching said field winding on and off, each of said rectifiers having a firing circuit, and circuit means connecting said firing circuits to said control unit for switching said rectifiers into operation under control by said unit.

6. In a rapid-excitation circuit according to claim 5, said circuit means comprising said condition-responsive means in controlling connection with only those of said controllable rectifiers that apply said auxiliary voltages to said field winding, whereby said latter rectifiers are turned off after said current has reached said intensity.

7. In a rapid-excitation circuit according to claim 2, said alternating-voltage supply means comprising a three-phase transformer having four secondary voltages which are electrically 90° displaced relative to each other and constitute said output voltages, said controllable rectifiers comprising four thyristors connected between said four output voltages and said winding, two of said thyristors forming said direct-voltage means for steady-state excitation of said winding, and said condition-responsive control means being connected to said other two thyristors only.

8. A rapid-excitation circuit according to claim 7, comprising an auxiliary voltage source of higher frequency than said alternating-voltage supply means, a firing control circuit having transformer means connecting said auxiliary source to said thyristors for firing the latter, and an inductive blocking member disposed in said control circuit and dependent upon the excitation current of said winding for separating said control circuit into high-voltage and low-voltage portions.

9. In a rapid-excitation circuit according to claim 8, said auxiliary voltage source comprising an astable flip-flop for generating a square wave, a control unit for make and break control of the excitation current of said field winding, and an amplifier, said flip-flop being connected through said unit and said amplifier to said firing control circuit.

10. A rapid-excitation circuit according to claim 8, comprising an IR-drop resistor in series with said field winding, said blocking member comprising an RC member with a capacitor and a reistance component connected in series across said IR-drop resistor, a transformer having a primary winding connected parallel to said capacitor and a secondary winding connected with said firing control circuit, and a diode connected in series between said primary winding and said capacitor.

References Cited

UNITED STATES PATENTS

| | | | |
|---|---|---|---|
| 3,026,454 | 3/1962 | Goodwin | 317—123 |
| 3,049,650 | 8/1962 | Greenblatt | 317—148.5 |
| 3,225,266 | 12/1965 | Baudo | 317—138 |
| 3,330,998 | 7/1967 | Windgrad | 317—148.5 X |

J. A. SILVERMAN, *Primary Examiner.*